J. W. McKELVEY.
SEWER TRAP VALVE.
APPLICATION FILED MAR. 12, 1914.
1,168,085.  Patented Jan. 11, 1916.
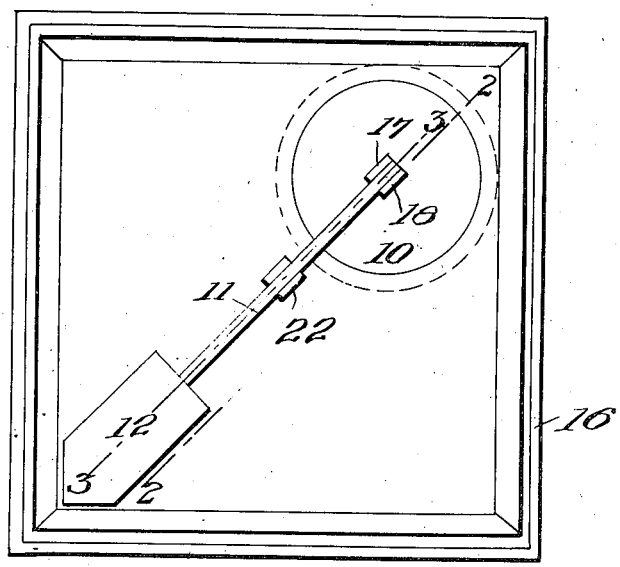
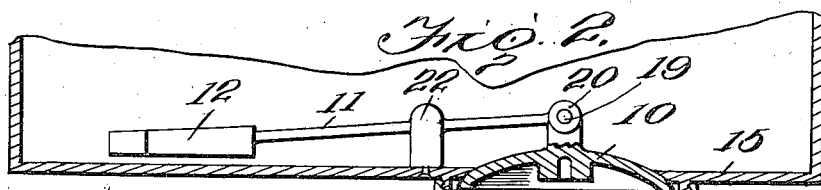
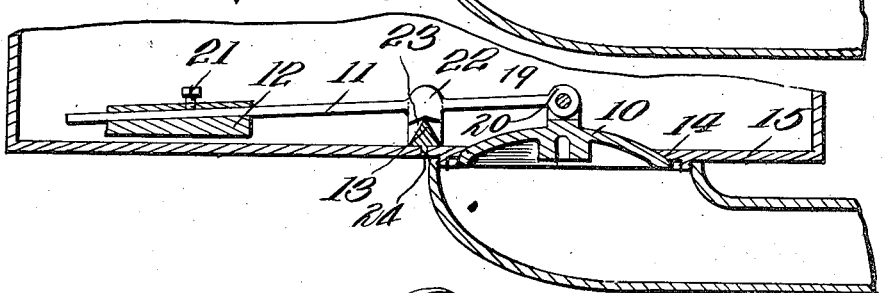
Inventor
J. W. McKelvey.
Witnesses
By
Attorneys.

UNITED STATES PATENT OFFICE.

JOHN W. McKELVEY, OF CHICAGO JUNCTION, OHIO.

SEWER-TRAP VALVE.

1,168,085.  Specification of Letters Patent.  Patented Jan. 11, 1916.

Application filed March 12, 1914. Serial No. 824,246.

*To all whom it may concern:*

Be it known that I, JOHN W. McKELVEY, citizen of the United States, residing at Chicago Junction, in the county of Huron and State of Ohio, have invented certain new and useful Improvements in Sewer-Trap Valves, of which the following is a specification.

My invention relates to new and useful improvements in outlet controlling valves for sink and sewer traps, and as its principal object aims to provide a counter-balanced pivoted outlet valve, which is normally seated to close the outlet of the trap, but will automatically open to allow the escape of water from the trap when the water therein rises to a predetermined height.

A further object is to so design and arrange the valve in relation to the trap that it will operate to prevent a back flow from the sewer and also prevent the escape of gases from the sewer through the trap.

An object of equal importance with the foregoing is to provide a valve of the class described which consists of a relatively few number of parts of simple construction, so that the valve may be cheaply manufactured, will be durable and efficient in its action, and may be readily applied to or removed from any standard form of sewer or sink trap.

The above and additional objects are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a top plan view of a conventional trap showing the valve in operative position; Fig. 2 is a section on the line 2—2 of Fig. 1; Fig. 3 is a section on the line 3—3 of Fig. 1; and Fig. 4 is a detail view of the pivotal support or fulcrum on which the valve stem is mounted.

The valve in its preferred embodiment includes the valve proper or valve body 10, a pivoted stem or lever 11, a counter-balance 12, and a pivotal support 13 which serves as a fulcrum for the lever or stem 11.

The valve member 10 is preferably formed of metal, and is concavo-convex in shape, being arranged to normally seat in the opening 14 which is formed in the base wall 15 of the trap box 16. The valve is arranged with its convex face engaging the beveled edge of the opening 14, which beveled edge serves as the valve seat. It will be seen that the concave face of the valve is thus so arranged that any back pressure of the water or gases in the sewer main will operate to move the valve into closed position, thus preventing the back flow of either the water or the gases through the trap box. Rising centrally from the upper convex face of the member 10 are a pair of apertured spaced lugs, indicated at 17 and 18 in Fig. 1. These members are provided as a means for attaching the terminal of the valve stem 11, and receive for this purpose a pivot pin 19. A terminal apertured disk 20 is formed on the valve stem 11, as best shown in Fig. 3 for the reception of the pivot pin 19.

The counter-weight or counterpoise 12 is formed from any relatively heavy metal, lead being preferably employed, although any other material may be substituted if found desirable. The member 12 is shown as being rectangular in shape, although it may be of any desired conformation without departing from the spirit of this invention. A slot extends through the member 12 to receive the valve stem 11. A set-screw, indicated at 21, is provided for the obvious purpose of holding the counterpoise in the desired position of longitudinal adjustment on the valve stem. This valve stem 11 consists of a metallic rod, which is formed intermediate its length and adjacent its disk terminal 20 with an enlarged portion 22, the lower edge of which is cut-away to provide a substantially V-shaped notch, indicated at 23. This V-shaped notch 23 is fitted over the triangular shaped lug, which has been hereinbefore designated by the numeral 13, and constitutes the pivotal support for the valve stem. This member 13 may be formed integrally with the base wall 15 of the trap box, or may be made separately therefrom and attached as by means of a fastening pin or rivet 24. On each side of the member 13 is arranged a guide or centering plate 25.

These members 25 rise above the upper edge of the member 13, and serve to prevent the lateral movement of the enlargement 22, thus preventing the accidental displacement of the valve stem from its pivotal support.

The operation of the valve will now be apparent, for it will be seen that, when the water has risen to a pre-determined height in the trap box 16, the weight of the water will be sufficient to depress the member 10, permitting the water to rush out through the opening 14. In this connection, it will be observed that by adjusting the counterpoise 12 on the valve stem, the user of the device may readily and conveniently vary the conditions under which the valve 10 will open to permit the escape of water from the trap box. If the counterpoise is positioned at the terminal of the valve stem it is obvious that it will require a considerable head of water to compress the valve 10, but if the counterpoise is arranged more nearly adjacent the pivotal point of the valve stem, it is apparent that it will respond to a relatively small head of water in the trap box. In this connection, it is to be observed as shown in Fig. 1 of the drawings, that the counterpoise 12 is adjustable upon the stem 11 to engage the side walls of the trap box, the outer terminal of the counter-poise being cut away to fit within the adjacent angle of the box. By this arrangement, the counterpoise may be moved into engagement with the said side walls of the box for holding the valve 10 in a fixed position and the valve body of the device is thus rendered adjustable either toward or away from its seat and may be locked or rigidly held at adjustment.

It will be observed that my valve is comparatively simple in construction, and that it may, therefore, be cheaply manufactured. It will be further noted that the valve is so designed that it may be readily attached to any form of sewer or sink trap by merely cutting a beveled edged opening in the bottom wall thereof to receive the valve body 10.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

What I claim is:—

1. The combination with a sewer trap box provided with side walls and a bottom wall having a circular opening formed therein, the edge defining said opening being flared outwardly, of an outlet valve mounted upon said bottom wall, said valve including a substantially concavo convex valve body normally engaging said flared edges by its convex face, with a portion of the valve body projecting into the box and with the lower edge of the valve body arranged exteriorly of the box, a valve stem pivotally connected to the valve body, a fulcrum for the valve stem connected to the bottom wall of the box, and a counterpoise adjustable on the valve stem within the box, said counterpoise being adapted to normally hold the valve in closed position and being adjustable to engage the side walls of the box for holding the valve in fixed position.

2. The combination with a sewer trap box having a side wall and a bottom wall provided with an opening, of a valve including a valve body adapted to fit in said opening, a valve stem fulcrumed upon the bottom wall, and a counterpoise adjustable on said stem to engage the side wall for holding the valve body in fixed position.

3. The combination with a sewer trap box having angularly disposed side walls and a bottom wall provided with an opening, of an outlet valve including a valve body adapted to fit in said opening, a valve stem pivotally mounted upon the bottom wall, and a counterpoise adjustable upon the valve stem and having one terminal thereof cut away to fit within the angle between adjacent side walls of the box, the counterpoise being movable to engage said adjacent side walls for holding the valve body in fixed position.

In testimony whereof I affix my signature in presence of two witnesses.

JOHN W. McKELVEY. [L. S.]

Witnesses:
CARL J. GUGLER,
MENZANITA SMITH.